United States Patent
Wang et al.

(10) Patent No.: US 9,667,363 B2
(45) Date of Patent: May 30, 2017

(54) REPORTING A MODIFIED SIGNAL QUALITY VALUE DURING ANTENNA DIVERSITY IMBALANCE

(71) Applicant: Verizon Patent and Licensing Inc., Arlington, VA (US)

(72) Inventors: Xin Wang, Morris Plains, NJ (US); Lily Zhu, Parsippany, NJ (US); Andrew E. Youtz, Princeton, NJ (US); Paul Venizelos, Ridgewood, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 64 days.

(21) Appl. No.: 14/878,487

(22) Filed: Oct. 8, 2015

(65) Prior Publication Data
US 2017/0104549 A1    Apr. 13, 2017

(51) Int. Cl.
*H04L 1/00* (2006.01)
*H04B 17/318* (2015.01)
*H04W 24/08* (2009.01)

(52) U.S. Cl.
CPC .......... *H04B 17/318* (2015.01); *H04W 24/08* (2013.01)

(58) Field of Classification Search
CPC ............................. H04B 17/318; H04W 24/08
See application file for complete search history.

(56) References Cited

U.S. PATENT DOCUMENTS

| | | | | |
|---|---|---|---|---|
| 2011/0136446 A1* | 6/2011 | Komninakis | ........ | H04B 7/0691 455/78 |
| 2013/0017797 A1* | 1/2013 | Ramasamy | .......... | H04B 7/0814 455/226.1 |
| 2013/0094550 A1* | 4/2013 | Coan | ..................... | H03F 1/3247 375/222 |
| 2015/0119026 A1* | 4/2015 | Bodduru | ............. | H04W 76/026 455/434 |
| 2015/0244431 A1* | 8/2015 | Vosburgh | ................. | H04B 7/04 375/347 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer; Measurements (Release 12)," http://www.3gpp.org/ftp/specs/archive/36_series/36.214/, Mar. 12, 2015, 17 pages.

* cited by examiner

*Primary Examiner* — Clemence Han (57) ABSTRACT

A device may determine a first signal quality value associated with a wireless signal received by a first antenna of the device, may determine a second signal quality value associated with a wireless signal received by a second antenna of the device, and may determine a combined signal quality value based on the first signal quality value and the second signal quality value. The device may apply an offset value to the first signal quality value to form a modified signal quality value, may compare the combined signal quality value and the modified signal quality value, and may selectively report the modified signal quality value or the combined signal quality value based on comparing the combined signal quality value and the modified signal quality value.

20 Claims, 4 Drawing Sheets

REPORTING A MODIFIED SIGNAL QUALITY VALUE DURING ANTENNA DIVERSITY IMBALANCE

BACKGROUND

Wireless devices often implement Multiple-Input Multiple-Output (MIMO) antenna technology to increase bandwidth, mitigate propagation errors, and optimize wireless range. The usage of multiple antennas may improve the quality and reliability of wireless links by facilitating the transmission and/or reception of different versions of the same data signal via multipath propagation. Further, usage of multiple antennas may mitigate negative effects associated with multipath interference conditions.

DETAILED DESCRIPTION OF PREFERRED EMBODIMENTS

The following detailed description of example implementations refers to the accompanying drawings. The same reference numbers in different drawings may identify the same or similar elements.

A user equipment (UE), such as a long term evolution (LTE) user device, may often incorporate multiple antennas having differing communication capabilities. For example, a Primary Receive/Transmit (PRx/Tx) antenna may both receive and transmit wireless signals whereas a Diversity Receive (DRx) antenna may solely receive wireless signals. The UE may determine reference signal quality values associated with reference signals received by the PRx/Tx antenna and/or the DRx antenna for use with network procedures (e.g., cell selection, cell re-selection, handover, a random access procedure, an uplink (UL) power control procedure, etc.). Moreover, the UE may report a reference signal quality value to a component of the UE, to one or more base stations, to a network, etc., for use with such network procedures.

In instances where a determined signal quality value associated with the DRx antenna significantly exceeds that of the PRx/Tx antenna, the UL capability of the PRx/Tx antenna may be inaccurately reflected by the downlink (DL) capability of the DRx antenna. In such instances, the UE may establish an insufficient connection with a network or may fail entirely to access a network. Implementations described herein may allow the UE to report a signal quality value that more accurately reflects UL performance capability when there is an imbalance in signal quality values measured on multiple antennas of the UE.

Figure 1:
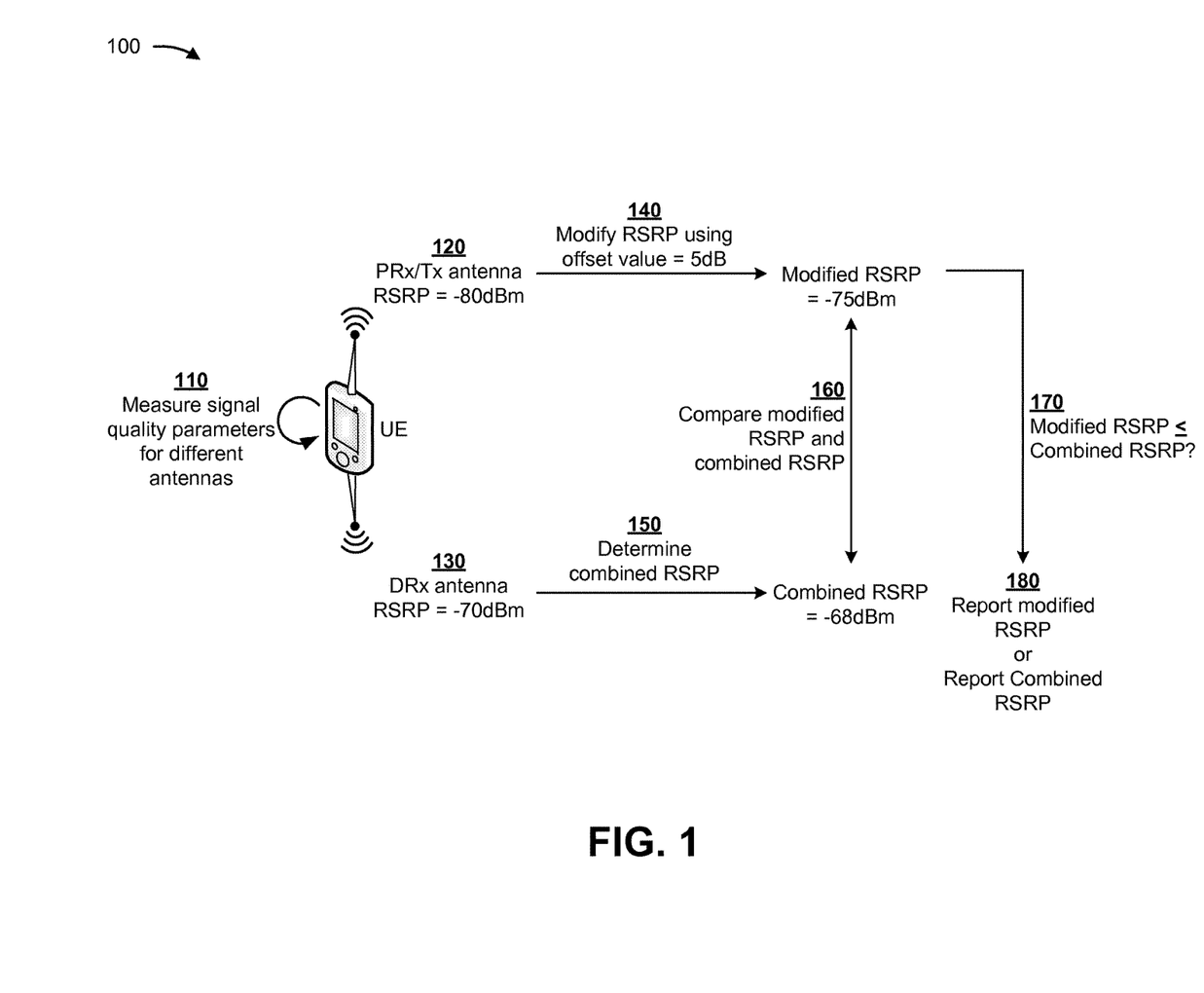
FIG. 1 is a diagram of an overview of an example implementation described herein.

FIG. 1 is a diagram of an overview of an example implementation 100 described herein. As shown in FIG. 1, example implementation 100 may include a UE, such as an LTE user device. The UE may receive various wireless reference signals from one or more base stations. As shown by reference number 110, the UE may measure signal quality parameters of wireless signals received by different antennas associated with the UE, such as a PRx/Tx antenna and a DRx antenna. For example, as shown by reference number 120, the UE may measure a signal received by the PRx/Tx antenna and may determine, for example, a reference signal received power (RSRP) value of −80 dBm. Further, as shown by reference number 130, the UE may measure a signal received by the DRx antenna and may determine, for example, an RSRP value of −70 dBm.

As further shown in FIG. 1, and by reference number 140, the UE may modify the RSRP value associated with the PRx/Tx antenna using an offset value (e.g., 5 dB) to determine, for example, a modified RSRP value of −75 dBm. As shown by reference number 150, the UE may perform a mathematical operation on the RSRP values of the PRx/Tx and DRx antennas and may determine, for example, a combined RSRP value of −68 dBm. For example, in accordance with the Third Generation Partnership Project (3GPP) standard, the UE may combine the RSRP values of the PRx/Tx antenna and the DRx antenna to determine a combined RSRP value that is greater than or equal to the greater of the RSRP values of either of the antennas. As shown by reference number 160, the UE may compare the modified RSRP value and the combined RSRP value. Further, as shown by reference number 170, the UE may determine whether the modified RSRP value is less than or equal to the combined RSRP value. Further still, as shown by reference number 180, the UE may report the modified RSRP value or the combined RSRP value based on determining whether the modified RSRP value is less than or equal to the combined RSRP value, for example, to a component of the UE for use with a network procedure (e.g., cell selection).

During antenna diversity imbalance situations, the RSRP value of the DRx antenna may not accurately reflect the UL transmission performance capability of the PRx/Tx antenna. For example, the RSRP value of the DRx antenna may be greater than the RSRP value of the PRx/Tx antenna. Per the 3GPP standard, the UE may report the combined RSRP value, which may be greater than or equal to the RSRP value of the DRx antenna. Moreover, the UE may report the combined RSRP value for use with a network procedure (e.g., cell selection). The combined RSRP value may satisfy a network procedure criteria (e.g., cell selection criteria), however, the poor UL transmission performance capability of the PRx/Tx antenna may result in communication issues. By reporting the modified RSRP value, the UE may report an RSRP value that more accurately reflects the UL transmission performance capability of the PRx/Tx antenna for use with such network procedures.

Figure 2:
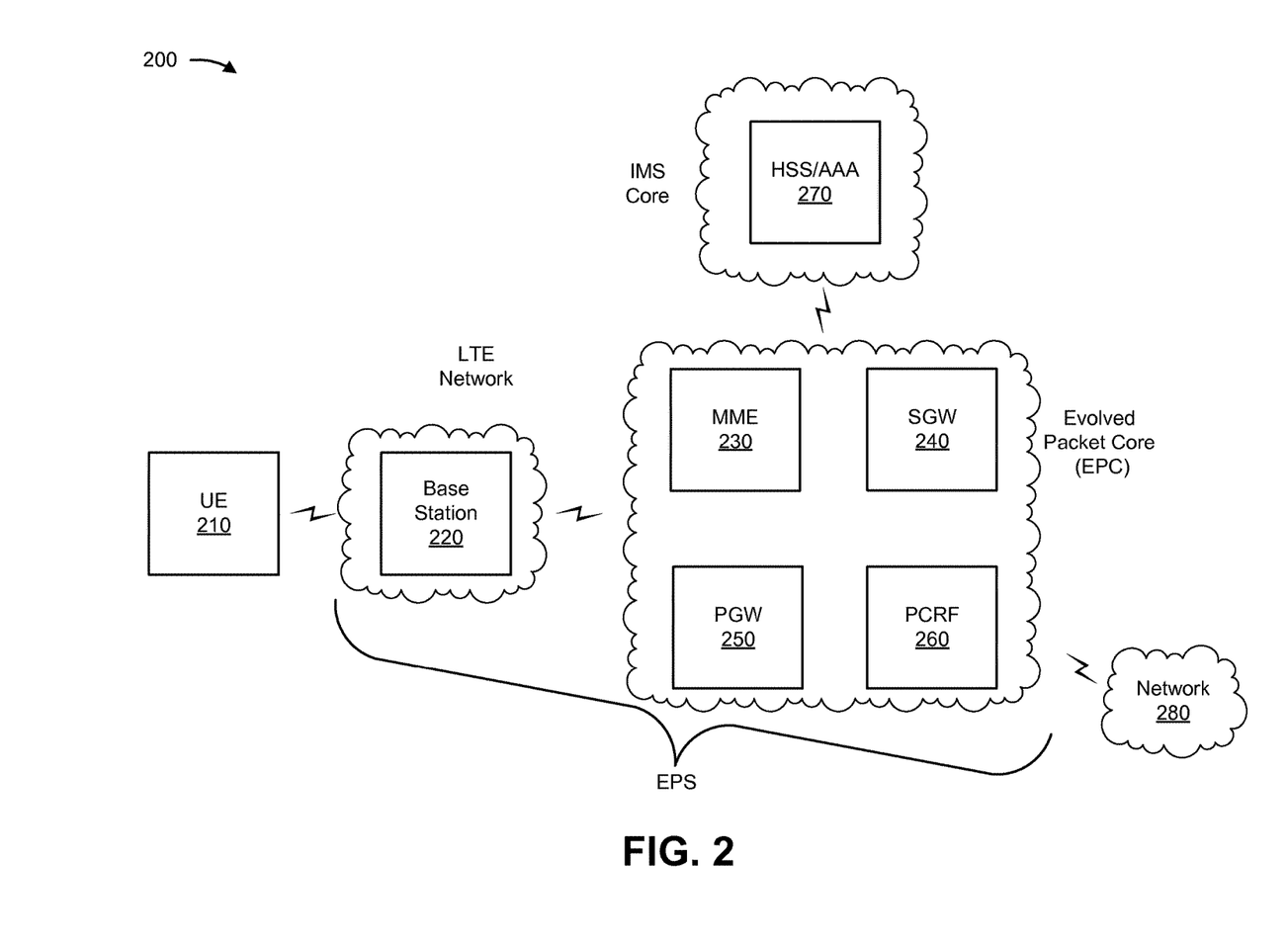
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment 210; a base station 220; a mobility management entity device (MME) 230; a serving gateway (SGW) 240; a packet data network gateway (PGW) 250; a policy charging and rules function (PCRF) 260; a home subscriber service/authentication, authorization, and accounting server (HSS/AAA) 270; and a network 280. Devices of environment 200 may interconnect via wired connections, wireless connections, or a combination of wired and wireless connections.

Some implementations are described herein as being performed within a LTE network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a 3GPP wireless communication standard. The LTE network may include a radio access network (RAN) that includes one or more base stations 220 that take the form of evolved Node Bs (eNBs) via which UE 210 communicates with the EPC. The EPC may include MME 230, SGW 240, PGW 250, and/or PCRF 260 that enable UE 210 to communicate with network 280 and/or an Internet protocol (IP) multimedia subsystem (IMS) core. The IMS core may include HSS/AAA 240, and may manage device registration and authentication, session initiation, etc., associated with UEs 210. HSS/AAA 270 may reside in the EPC and/or the IMS core.

UE 210 may include one or more devices capable of connecting to a network via base station 220. For example, UE 210 may include a communication device, such as a mobile phone (e.g., a smart phone, a radiotelephone, etc.), a tablet computer, a wearable communication device (e.g., a smart wristwatch, a pair of smart eyeglasses, etc.), or a similar type of device. UE 210 may include two or more antennas for communicating with base station 220, such as a PRx/Tx antenna, a DRx antenna, or the like. UE 210 may send traffic to and/or receive traffic from network 280 via base station 220 (e.g., based on a radio access bearer between UE 210 and SGW 240). UE 210 may be associated with an RF access signaling usage policy (e.g., an RF access signaling usage billing policy and/or an RF access signaling usage control policy).

Base station 220 may include one or more devices capable of transferring traffic, such as audio, video, text, and/or other traffic, destined for and/or received from UE 210. In some implementations, base station 210 may include an eNB associated with the LTE network that receives traffic from and/or sends traffic to network 280 via SGW 240 and/or PGW 250. Additionally, or alternatively, one or more base stations 220 may be associated with a RAN that is not associated with an LTE network. Base station 220 may send traffic to and/or receive traffic from UE 210 via an air interface (e.g., an RF signal). In some implementations, base station 220 may include a small cell base station, such as a base station of a microcell, a picocell, and/or a femtocell.

MME 230 may include one or more devices, such as one or more server devices, capable of managing authentication, activation, deactivation, and/or mobility functions associated with UE 210. In some implementations, MME 230 may perform operations relating to authentication of UE 210. Additionally, or alternatively, MME 230 may facilitate the selection of a particular SGW 240 and/or a particular PGW 250 to serve traffic to and/or from UE 210. MME 230 may perform operations associated with handing off UE 210 from a first base station 220 to a second base station 220 when UE 210 is transitioning from a first cell associated with the first base station 220 to a second cell associated with the second base station 220. Additionally, or alternatively, MME 230 may select another MME (not pictured), to which UE 210 should be handed off (e.g., when UE 210 moves out of range of MME 230).

In some implementations, MME 230 may receive and/or store information indicating that UE 210 is associated with an RF access signaling usage billing policy and/or an RF access signaling usage control policy. MME 230 may receive a service request from UE 210, and may cause UE 210 to establish a radio access bearer with SGW 240 via base station 220 based on the service request. MME 230 may perform actions based on an RF access signaling usage control policy (e.g., rerouting RF signals, delaying and/or dropping RF signals, assigning a particular priority to an RF signal, etc.) based on information received from PGW 250 or another device.

SGW 240 may include one or more devices capable of routing packets. For example, SGW 240 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 240 may aggregate traffic received from one or more base stations 220 associated with the LTE network, and may send the aggregated traffic to network 280 (e.g., via PGW 250) and/or other network devices associated with the EPC and/or the IMS core. SGW 240 may also receive traffic from network 280 and/or other network devices, and may send the received traffic to UE 210 via base station 220. Additionally, or alternatively, SGW 240 may perform operations associated with handing off UE 210 to and/or from an LTE network. SGW 240 may provide communications to and/or receive communications from PGW 250 (e.g., modify bearer requests based on RF access signaling usage, modify bearer responses based on RF access signaling usage, etc.) in a situation where UE 210 is associated with an RF access signaling usage billing policy and/or an RF access signaling usage control policy.

PGW 250 may include one or more devices capable of providing connectivity for UE 210 to external packet data networks (e.g., other than the depicted EPC and/or LTE network). For example, PGW 250 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 250 may aggregate traffic received from one or more SGWs 240, and may send the aggregated traffic to network 280. Additionally, or alternatively, PGW 250 may receive traffic from network 280, and may send the traffic to UE 210 via SGW 240 and base station 220. PGW 250 may record data usage information (e.g., byte usage), and may provide the data usage information to HSS/AAA 270.

PCRF 260 may include one or more network devices, or other types of communication devices. PCRF 260 may store subscriber information, such as voice call and data rate plans or quotas for subscribers. PCRF 260 may provide network control regarding service data flow detection, gating, QoS, and/or flow-based charging. Policies and rules regarding QoS may include policies and rules instructing UE 210 and/or network elements (base station 220, MME 230, SGW 240, PGW 250, etc.) to minimize packet loss, to implement a packet delay budget, to provide a guaranteed bit rate (GBR), to provide a particular latency, to reduce RF signal congestion, and/or to perform other activities associated with QoS. PCRF 260 may provide policies and rules to other network devices, such as base station 220, SGW 240, PGW 250, or the like, to implement network control. PCRF 260 may determine how a certain service data flow shall be treated, and may ensure that user plane traffic mapping and QoS is in accordance with a user's profile and/or network policies.

HSS/AAA 270 may include one or more devices, such as one or more server devices, capable of managing (e.g., receiving, generating, storing, processing, and/or providing) information associated with UE 210. For example, HSS/AAA 270 may manage subscription information associated with UE 210, such as information that identifies a subscriber profile of a user associated with UE 210, information that identifies services and/or applications that are accessible to UE 210, location information associated with UE 210, a network identifier (e.g., a network address) that identifies UE 210, information that identifies a treatment of UE 210 (e.g., quality of service information, a quantity of minutes allowed per time period, a quantity of data consumption allowed per time period, etc.), information that identifies whether UE 210 is associated with an RF access signaling usage control policy and/or an RF access signaling usage billing policy, and/or similar information. HSS/AAA 270 may provide this information to one or more other devices of environment 200 to support the operations performed by those devices.

HSS/AAA 270 may perform authentication operations for UE 210 and/or a user of UE 210 (e.g., using one or more credentials), may control access, by UE 210, to a service and/or an application (e.g., based on one or more restrictions, such as time-of-day restrictions, location restrictions, single or multiple access restrictions, read/write restrictions, RF access signaling usage restrictions, etc.), may track resources consumed by UE 210 (e.g., a quantity of voice minutes consumed, a quantity of data consumed, a quantity of RF signals transmitted, a quantity of radio access bearers requested and/or established, etc.), and/or may perform similar operations.

Network 280 may include one or more wired and/or wireless networks. For example, network 280 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
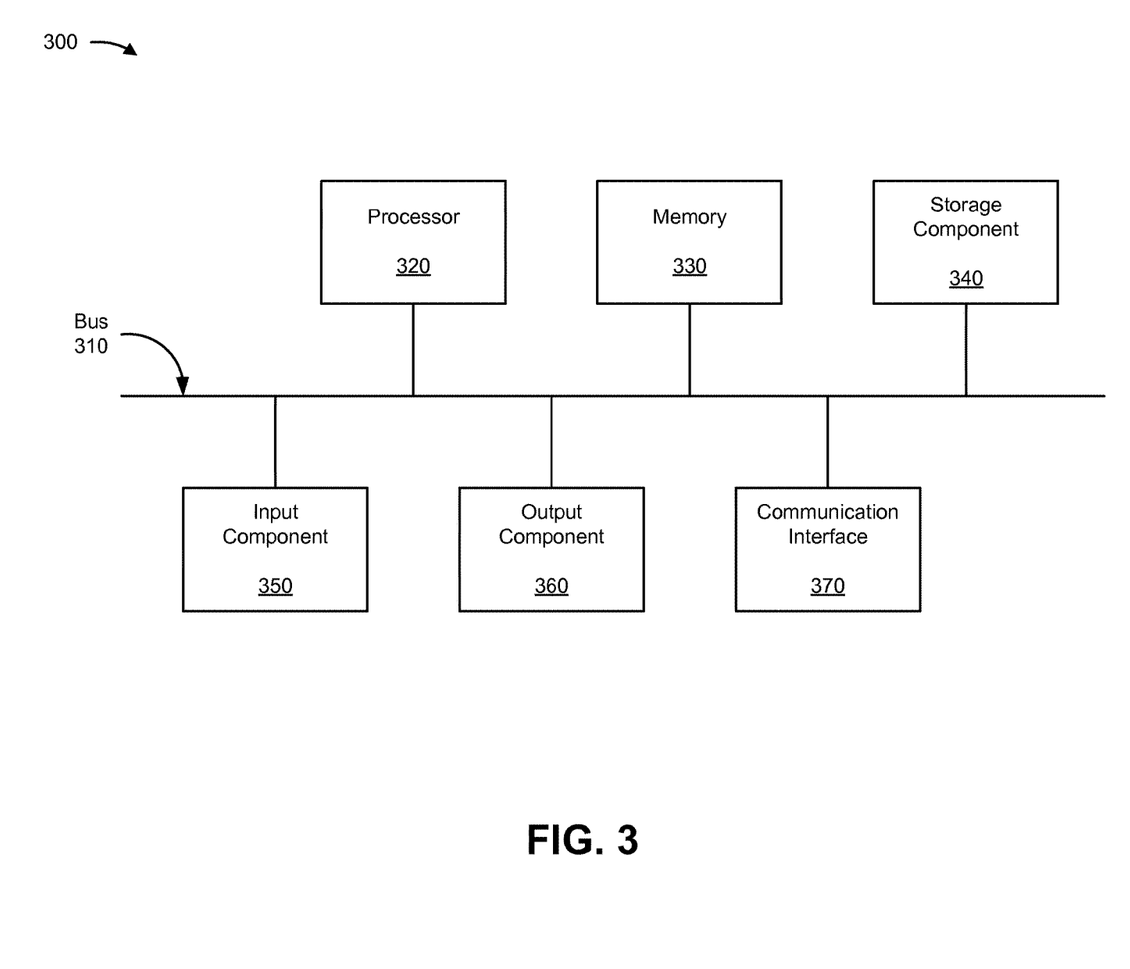
FIG. 3 is a diagram of example components of one or more devices of FIG. 2.

FIG. 3 is a diagram of example components of a device 300. Device 300 may correspond to UE 210, base station 220, MME 230, SGW 240, PGW 250, PCRF 260, and/or HSS/AAA 270. In some implementations, UE 210, base station 220, MME 230, SGW 240, PGW 250, PCRF 260, and/or HSS/AAA 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
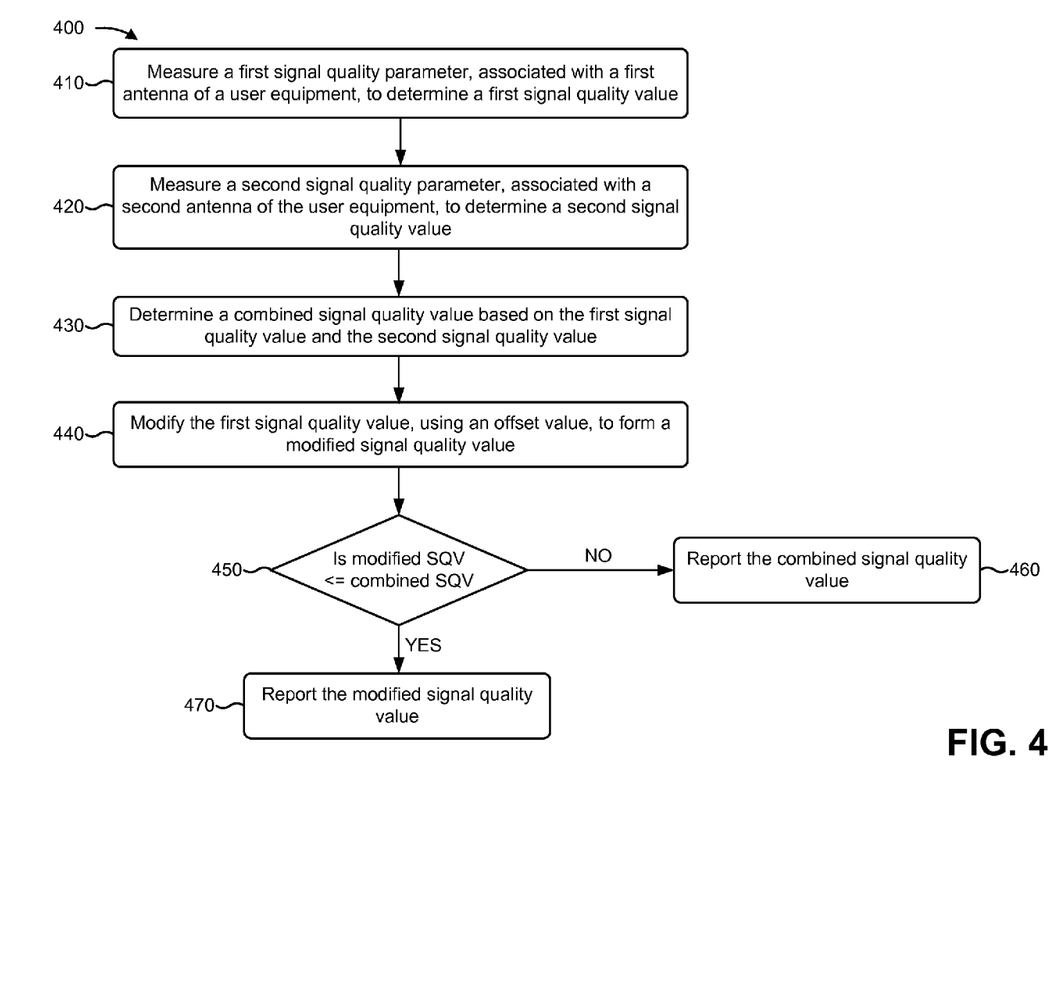
FIG. 4 is a flow chart of an example process for reporting a modified signal quality value or a combined signal quality value during antenna diversity imbalance.

FIG. 4 is a flow chart of an example process 400 for reporting a modified signal quality value or a combined signal quality value during antenna diversity imbalance. In some implementations, one or more process blocks of FIG. 4 may be performed by UE 210. In some implementations, one or more process blocks of FIG. 4 may be performed by another device or a group of devices separate from or including UE 210, such as base station 220.

As shown in FIG. 4, process 400 may include measuring a first signal quality parameter, associated with a first antenna of a user equipment, to determine a first signal quality value (block 410). For example, UE 210 may measure a wireless signal received via the first antenna. The first antenna may be used for both receiving and transmitting wireless signals (e.g., used during UL and DL). For example, the first antenna may be a PRx/Tx antenna. In some implementations, UE 210 may receive the first wireless signal from base station 220. Base station 220 may be a serving base station with which UE 210 is communicating, and may be associated with a first radio access technology (RAT). The first RAT may include, for example, a 4G RAT, a 3G RAT, a 2G RAT, an LTE RAT, an LTE-Advanced (LTE-A) RAT, a Wi-Fi RAT, or the like. In some implementations, base station 220 may be a neighboring base station associated with the first RAT. Additionally, and/or alternatively, base station 220 may be a neighboring base station associated with a RAT different from the first RAT.

UE 210 may measure a first signal quality parameter associated with a wireless signal. The first signal quality parameter may include a parameter associated with a wireless signal, such as a reference signal, between UE 210 and base station 220. For example, the first signal quality parameter may represent an RSRP, a received signal code power (RSCP), a received signal strength indicator (RSSI), a reference signal received quality (RSRQ), a block error rate (BLER), a signal-to-interference-plus-noise ratio (SINR), or the like. In some implementations, the first signal quality parameter may be represented using a first signal quality value, such as a decibel value (e.g., an RSRP value, an RSRQ value, a SINR value, etc.).

As further shown in FIG. 4, process 400 may include measuring a second signal quality parameter, associated with a second antenna of the user equipment, to determine a second signal quality value (block 420). For example, UE 210 may measure a wireless signal received via the second antenna. In some implementations, the first antenna and the second antenna may receive the same signal transmitted by base station 220. In some implementations, the first antenna and the second antenna may receive different signals (e.g., consecutive signals transmitted by base station 220). Like the first signal quality parameter, the second signal quality parameter may include a parameter associated with a wireless signal, such as a reference signal, between UE 210 and base station 220. In some implementations, the second signal quality parameter may be the same parameter as the first signal quality parameter (e.g., if the first signal quality parameter is an RSRP value, the second value may be an RSRP value, etc.). Further, the second signal quality parameter may be represented using a second signal quality value, such as a decibel value (e.g. an RSRP value, an RSRQ value, a SINR value, etc.).

In some implementations, the second antenna may be an antenna used only to receive wireless signals. For example, the second antenna may be a DRx antenna. In some implementations, the second antenna may have a different design and/or configuration than the first antenna. Moreover, in some implementations, the second antenna may be located in a different location in UE 210 than the first antenna. For example, the first antenna may be located near the top of UE 210, and the second antenna may be located near the bottom of UE 210. Because of the difference in positions of the antennas, the first antenna may be obstructed (e.g., by a hand of a user), whereas the second antenna may remain unobstructed, or vice versa. Thus, for example, the first antenna and the second antenna may receive reference signals having different signal quality values (e.g., RSRP values).

As further shown in FIG. 4, process 400 may include determining a combined signal quality value based on the first signal quality value and the second signal quality value (block 430). For example, UE 210 may determine a combined signal quality value by performing a mathematical operation using the first signal quality value and the second signal quality value (e.g., by combining the signal quality values, by determining a mean or median of the signal quality values, by selecting one of the signal quality values, by multiplying one of the signal quality values by a weight value, etc.). In some implementations, the combined signal quality value may represent an RSRP, and may be represented by a combined signal quality value, such as a decibel value. Per the 3GPP standard, the combined signal quality value may be set to a value that is greater than or equal to the greater of the first signal quality value or the second signal quality value.

In some cases, the second signal quality value associated with the DRx antenna may exceed that of the first signal quality value, associated with the PRx/Tx antenna, by a particular amount (e.g., 6 dB, 10 dB, etc.). Various factors may cause the diversity imbalance in values (e.g., antenna design, antenna location, phone position, interference conditions, etc.). In such cases, UE 210 may report a combined signal quality value that is at least as great as the second signal quality value, as per the 3GPP standard, which may result in communication issues. For example, UE 210 may report the combined signal quality value during network procedures, such as cell selection, re-selection, handover, UL power control (e.g., UL power control for UL channels such as a physical uplink shared channel (PUSCH), a physical uplink control channel (PUCCH), a sounding reference signal channel (SRS), and/or a random access channel (RACH)), etc., despite the transmission capabilities of the PRx/Tx antenna being lower than what base station 220 expects based on the combined signal quality value reported by UE 210. During antenna diversity imbalance, the combined signal quality value may not accurately reflect the UL transmission performance capability of the PRx/Tx antenna. Moreover, while a second signal quality value (e.g., RSRP value) may satisfy a certain threshold for a criteria of a network procedure (e.g., cell selection, etc.), UE 210 may fail to communicate with base station 220 and/or network 280 due to the poor (e.g., lower than expected) signal quality of the PRx/Tx antenna. Additionally, even if UE 210 establishes a connection, the transmission capabilities of the PRx/Tx antenna may result in poor in-call performance, reduced voice quality, audio gaps, low data throughput, radio link failure, radio resource control drop, etc. Thus, in implementations described herein, UE 210 may determine a signal quality value that more accurately reflects UL transmission performance capability of the PRx/Tx antenna.

As further shown in FIG. 4, process 400 may include modifying the first signal quality value, using an offset value, to form a modified signal quality value (block 440). For example, UE 210 may modify the first signal quality value, by performing a mathematical operation using the first signal quality value and an offset value, to form a modified signal quality value. UE 210 may modify the first signal quality value such that the modified signal quality value is greater than or equal to the first signal quality value. In some implementations, UE 210 may add the offset value to the first signal quality value. Additionally, or alternatively, UE 210 may multiply the first signal quality value and the offset value. Additionally, or alternatively, UE 210 may perform another mathematical operation, using the first signal quality value and the offset value, to form the modified signal quality value.

The offset value may be a value that, when combined with the first signal quality value, results in a modified signal quality value that is greater than or equal to the first signal quality value. For example, when UE 210 adds the offset value to the first signal quality value, the offset value may be a value greater than or equal to zero. For example, if the first signal quality value is an RSRP value (e.g., −80 dBm), the offset value may be a decibel value (e.g., 2 dB, 3 dB, 4 dB, etc.). In some implementations, UE 210 may be configured with the offset value, and may store the offset value in memory. Additionally, or alternatively, UE 210 may receive the offset value from base station 220, such that the offset value is configurable by a network operator.

UE 210 may use the modified signal quality value when performing a network procedure (e.g., cell selection, cell re-selection, handover, UL power control, etc.) to more accurately reflect UL performance capability of the PRx/Tx antenna. For example, UE 210 may use a modified signal quality value represented by an RSRP value (e.g., −75 dBm) when performing cell selection, or the like. For example, in diversity imbalance situations (e.g., where the second signal quality value exceeds the first signal quality value), compared to the combined signal quality value, the modified signal quality value may more accurately represent the UL capability of UE 210. By reporting the modified signal quality value rather than the combined signal quality value, UE 210 may more accurately reflect UL transmission performance capability when performing a network procedure (e.g., cell selection).

In some implementations, UE 210 may modify the first signal quality value when the difference between the first signal quality value and the second quality value satisfies a certain threshold (e.g., 6 dB, 7 dB, 10 dB, etc.). For example, UE 210 may compare the first signal quality value and the second signal quality value to determine if a diversity imbalance exists. Further, if the difference does not satisfy the threshold, UE 210 may report the combined signal quality value according to the 3GPP standard. In some implementations, UE 210 may store a preconfigured threshold value in memory. Additionally, or alternatively, the threshold may be reconfigurable. For example, UE 210 may receive information that identifies the threshold from base station 220, and may configure UE 210 based on the information.

As further shown in FIG. 4, process 400 may include determining whether the modified signal quality value is less than or equal to the combined signal quality value (block 450). For example, UE 210 may compare the modified signal quality value and the combined signal quality value to determine whether the modified signal quality value is less than or equal to the combined signal quality value. In some implementations, UE 210 may compare the modified signal quality value and the combined signal quality value to determine whether the modified signal quality value is less than (and not equal to) the combined signal quality value. UE 210 may compare the modified signal quality value and the combined signal quality value to determine which signal quality value to report. By reporting the lower of either the modified signal quality value or the combined signal quality value, UE 210 may report a signal quality value that more accurately reflects the UL transmission performance capability of the PRx/Tx antenna when the PRx/Tx antenna is associated with a lower signal quality value than the DRx antenna.

As further shown in FIG. 4, if the modified signal quality value is not less than or equal to the combined signal quality value, then process 400 may include reporting the combined signal quality value (block 460). For example, if UE 210 determines that the modified signal qualify value is not less than or equal to the combined signal quality value, then UE 210 may report the combined signal quality value. Per the 3GPP standard, the combined signal quality value that is reported may be no less than the greater of either the first signal quality value or the second signal quality value. UE 210 may report the combined signal quality value to a component of UE 210 for use with a network procedure. Additionally, or alternatively, UE 210 may report the combined signal quality value to base station 220 for use with a network procedure. The network procedure may include a measurement report, cell selection, cell re-selection, handover, UL power control, etc. In such cases, the combined signal quality value may provide an accurate reflection of the transmission performance capability of the PRx/Tx antenna. Moreover, in such cases, antenna diversity imbalance may not exist. For instance, the first signal quality value may exceed the second signal quality value. Alternatively, the second signal quality value or the combined signal quality value may exceed the first signal quality value by less than the offset value. Thus, in such cases, the combined signal quality value may accurately represent the transmission performance capability of the PRx/Tx antenna.

As further shown in FIG. 4, if the modified signal quality value is less than or equal to the combined signal quality value, then process 400 may include reporting the modified signal quality value (block 470). For example, if UE 210 determines that the modified signal quality value is less than or equal to the combined signal quality value, then UE 210 may report the modified signal quality value. UE 210 may report in a similar manner as described above with respect to the combined signal quality value (e.g., may report to a component of UE 210 and/or to base station 220 for use with a network procedure). In such cases, the combined signal quality value may not accurately reflect the transmission performance capability of the PRx/Tx antenna. For example, the second signal quality value may exceed the first signal quality value. Additionally, the second signal quality value or the combined signal quality value may exceed the first signal quality value by more than the offset value. Thus, antenna diversity imbalance may exist, and reporting the modified signal quality value may mitigate the negative effects associated with reporting the combined signal quality value during such imbalance. Moreover, the modified signal quality value may more accurately represent a UL transmission performance capability of the PRx/Tx antenna. By reporting the modified signal quality value for use with network procedures, UE 210 may establish a more robust communication link with base station 220 and/or network 280. In this way, UE 210 may save processor and/or memory resources by avoiding poor communication conditions (e.g., low data throughput, dropped connections, etc.). Moreover, network 280 may save resources by establishing a more robust communication link with UE 210.

While process 400 is described above in connection with a first antenna and a second antenna, in some implementations, UE 210 may include more than two antennas. Additionally, or alternatively, UE 210 may include more than two transmit antennas. In such cases, UE 210 may determine a signal quality value for each transmit antenna. For example, UE 210 may determine an RSRP value for a first transmit antenna, an RSRP value for a second transmit antenna, etc. UE 210 may then compare the signal quality values of each transmit antenna, and may select a signal quality value to modify to form the modified signal quality value. For example, UE 210 may modify the greatest signal quality value to determine the modified signal quality value. Additionally, or alternatively, UE 210 may modify a signal quality value associated with an antenna that UE 210 is using to transmit. UE 210 may compare the modified signal quality value to the combined signal quality value described above. If the modified signal quality value is less than or equal to the combined signal quality value, UE 210 may report the modified signal quality value. Alternatively, if the modified signal quality value is not less than or equal to the combined signal quality value, UE 210 may report the combined signal quality value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The implementations described herein may allow a UE to report a signal quality value that accurately reflects UL transmission performance capability for use in performing a network procedure. Moreover, UE 210 may establish a more robust communication link with network 280 by reporting the modified signal quality value rather than the combined signal quality value. In this way, UE 210 and/or network 280 may save resources by avoiding poor communication conditions that might result in dropped calls, low data throughput, etc.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   determine a first signal quality value associated with a wireless signal received by a first antenna of the device;
   determine a second signal quality value associated with a wireless signal received by a second antenna of the device;
   determine a combined signal quality value based on the first signal quality value and the second signal quality value;
   apply an offset value to the first signal quality value to form a modified signal quality value;
   compare the combined signal quality value and the modified signal quality value; and
   selectively report the modified signal quality value or the combined signal quality value based on comparing the combined signal quality value and the modified signal quality value.

2. The device of claim 1, where the first signal quality value includes a first reference signal received power (RSRP) value; and
   where the second signal quality value includes a second RSRP value.

3. The device of claim 1, where the one or more processors, when comparing the combined signal quality value and the modified signal quality value, are to:
determine whether the modified signal quality value is less than or equal to the combined signal quality value.

4. The device of claim 1, where the first antenna is used to transmit and receive wireless signals; and
where the second antenna is used to receive wireless signals.

5. The device of claim 1, where the one or more processors are further to:
determine that a difference between the first signal quality value and the second signal quality value satisfies a threshold; and
where the one or more processors, when applying the offset value to the first signal quality value, are to:
apply the offset value to the first signal quality value based on determining that the difference between the first signal quality value and the second signal quality value satisfies the threshold.

6. The device of claim 1, where the modified signal quality value is greater than or equal to the first signal quality value.

7. The device of claim 1, where the one or more processors are further to:
receive the offset value from a base station; and
where the one or more processors, when applying the offset value to the first signal quality value, are to:
apply the offset value to the first signal quality value based on receiving the offset value from the base station.

8. A non-transitory computer-readable medium storing instructions, the instructions comprising:
one or more instructions that, when executed by one or more processors of a device, cause the one or more processors to:
determine a first signal quality value associated with a wireless signal received by a first antenna of the device;
determine a second signal quality value associated with a wireless signal received by a second antenna of the device;
determine a combined signal quality value based on the first signal quality value and the second signal quality value;
apply an offset value to the first signal quality value to form a modified signal quality value;
compare the combined signal quality value and the modified signal quality value; and
report the modified signal quality value based on comparing the combined signal quality value and the modified signal quality value.

9. The non-transitory computer-readable medium of claim 8, where the one or more instructions, when executed by the one or more processors, cause the one or more processors to:
determine that a difference between the first signal quality value and the second signal quality value satisfies a threshold; and
where the one or more instructions, that cause the one or more processors to apply the offset value to the first signal quality value, cause the one or more processors to:
apply the offset value to the first signal quality value based on determining that the difference between the first signal quality value and the second signal quality value satisfies the threshold.

10. The non-transitory computer-readable medium of claim 8, where the modified signal quality value is greater than the first signal quality value.

11. The non-transitory computer-readable medium of claim 8, where the first signal quality value includes at least one of:
a reference signal received power (RSRP) value;
a reference signal received quality (RSRQ) value; or
a signal-to-interference-plus-noise ratio (SINR) value.

12. The non-transitory computer-readable medium of claim 8, where the second antenna is associated with a receiver.

13. The non-transitory computer-readable medium of claim 8, where the first antenna is associated with a transmitter and a receiver.

14. The non-transitory computer-readable medium of claim 8, where the one or more instructions, that cause the one or more processors to compare the combined signal quality value and the modified signal quality value, further cause the one or more processors to:
determine that the modified signal quality value is less than or equal to the combined signal quality value; and
where the modified signal quality value is reported based on determining that the modified signal quality value is less than or equal to the combined signal quality value.

15. A method, comprising:
measuring, by a device, a first signal quality parameter to determine a first signal quality value associated with a first antenna of the device;
measuring, by the device, a second signal quality parameter to determine a second signal quality value associated with a second antenna of the device;
determining, by the device, a combined signal quality value based on the first signal quality value and the second signal quality value;
applying, by the device, an offset value to the first signal quality value to form a modified signal quality value;
comparing, by the device, the combined signal quality value and the modified signal quality value; and
providing, by the device and based on comparing the combined signal quality value and the modified signal quality value, the combined signal quality value or the modified signal quality value for a network procedure.

16. The method of claim 15, further comprising:
determining that the combined signal quality value is less than or equal to the modified signal quality value; and
where providing the combined signal quality value or the modified signal quality value comprises:
providing the combined signal quality value based on determining that the combined signal quality value is less than or equal to the modified signal quality value.

17. The method of claim 15, where the network procedure includes at least one of:
a cell selection procedure;
a cell re-selection procedure;
a handover procedure;
a random access procedure; or
an uplink power control procedure.

18. The method of claim 15, where comparing the combined signal quality value and the modified signal quality value comprises:
determining whether the modified signal quality value is less than or equal to the combined signal quality value.

19. The method of claim 15, further comprising:
determining that the modified signal quality value is less than or equal to the combined signal quality value; and where providing the combined signal quality value or the modified signal quality value comprises:
  providing the modified signal quality value based on determining that the modified signal quality value is less than or equal to the combined signal quality value.

20. The method of claim 15, where the first signal quality parameter and the second signal quality parameter represent a reference signal received power (RSRP) parameter.

* * * * *